US006205135B1

United States Patent
Chinni et al.

(12) United States Patent
(10) Patent No.: US 6,205,135 B1
(45) Date of Patent: *Mar. 20, 2001

(54) ACCESS PLATFORM FOR INTERNET-BASED TELEPHONY

(75) Inventors: Venkata Ramana Chinni, Eatontown; Krishna Gudapati, Holmdel; Kar-Wing Edward Lor, Middletown, all of NJ (US)

(73) Assignee: Lucent Technologies Inc, Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/812,827

(22) Filed: Mar. 6, 1997

(51) Int. Cl.[7] .................................................. H04L 12/66
(52) U.S. Cl. .......................... 370/356; 370/354; 379/221
(58) Field of Search .................................. 370/352, 354, 370/356, 522, 349, 400, 401; 379/201, 207, 220, 221, 114, 115, 130, 131, 355; 706/10

(56) References Cited

U.S. PATENT DOCUMENTS

| 4,281,218 |   | 7/1981  | Chuang et al.   | 179/1   |
|-----------|---|---------|-----------------|---------|
| 4,791,665 |   | 12/1988 | Bogart et al.   | 379/207 |
| 5,519,769 |   | 5/1996  | Weinberger      | 379/112 |
| 5,550,915 | * | 8/1996  | Patridge, III   | 379/355 |
| 5,563,938 | * | 10/1996 | Soshea et al.   | 379/201 |
| 5,608,786 | * | 3/1997  | Gordon          | 370/352 |
| 5,726,984 | * | 3/1998  | Kubler et al.   | 370/349 |
| 5,727,129 | * | 3/1998  | Barrett et al.  | 706/10  |
| 5,764,741 | * | 6/1998  | Barak           | 379/114 |
| 5,799,072 | * | 8/1998  | Vulcan et al.   | 379/114 |
| 5,862,203 | * | 1/1999  | Wulkan et al.   | 379/114 |
| 5,867,495 | * | 2/1999  | Elliott et al.  | 370/352 |

OTHER PUBLICATIONS

Nathan Muller, "Dial 1–800–Internet", Byte, Feb., 1996, vol. 21, No. 2, p. 83.
Douglas W. Johnson, "Internet–connected Phone Calls Dial in to Lower Prices", Computerworld, Feb. 1996, p. 61.
"Internet Long Distance", GeoAccess Network, WorldWide Web, http://www.globalexpo.net/geoaccess/long.html.
"Perspective; The Internet Phone Is Poised To Conquer", Communications Week, Dec. 11, 1996.
"IDT Announces Major Breakthrough That Will Allow Worldwide PC–to–Telephone Calls Over The Internet"PR Newswire Association Inc., Oct. 23,1995, Financial News.
Dow Jones article on Dialogic Corp. and VocalTec Ltd., Feb. 14, 1996.

* cited by examiner

*Primary Examiner*—Hassan Kizou
*Assistant Examiner*—John Pezzlo
(74) *Attorney, Agent, or Firm*—Joseph J. Opalach

(57) ABSTRACT

An alternate access platform is coupled to the Internet, a local-exchange-carrier (LEC), and other communications facilities such as a plurality of long-distance facilities provided by any one of a number of long distance carriers. Access to the alternate access platform occurs in any one of a number of ways. For example, a user, or calling party, establishes an Internet connection to the alternate access platform, or dials into the alternate access platform via a local plain-old-telephone-service (POTS) call. Independent of the access method, the alternate access platform selects a communications facility for routing the call as a function of a "call profile" associated with the calling party. This "call profile" uses any one of a number of parameters to determine routing such as called party, cost, quality, reliability, time-of-day, etc. This "call profile" is either determined by the user on a call-by-call basis, or is separately administered by the user.

5 Claims, 3 Drawing Sheets

FACILITIES TABLE

|                  | INTERNET | LD CARRIER 1 | LD CARRIER 2 |
|------------------|----------|--------------|--------------|
| COST *           | $X       | $Y           | $Z           |
| GRADE-OF-SERVICE | LOW      | HIGH         | HIGH         |

* MAY BE MULTIPLE ENTRIES INDEXED TO TIME OF DAY, DAY OF WEEK, ETC.

FIG. 4
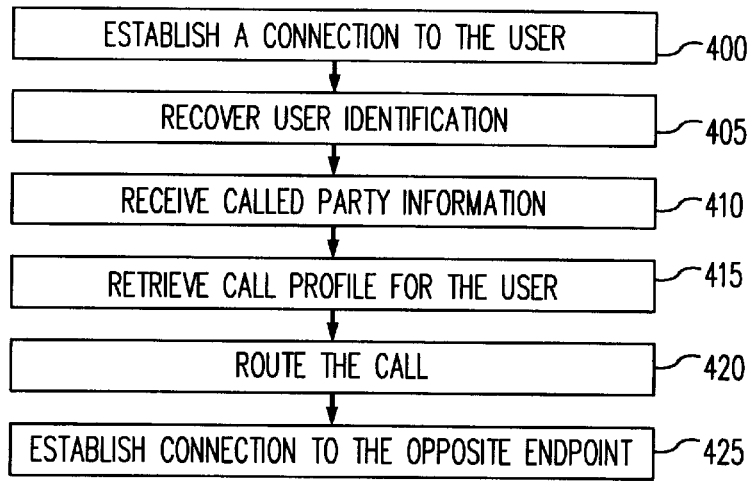
FIG. 5
CALLED PARTY TABLE
| USER | CALLED PARTY NUMBER | QUALITY | ROUTING |
|---|---|---|---|
| USER 151-N | (908) 767-3211 | LOW | LEAST COST |
|  | (204) 789-7612 | HIGH | FIRST AVAILABLE |
|  | (312) 722-7670 | N/A | LD CARRIER 1 |
FIG. 6
ROUTING TABLE
| USER | ENCODE | QUALITY | ROUTING |
|---|---|---|---|
| USER 151-N | YES | LOW | LEAST COST |
FIG. 7
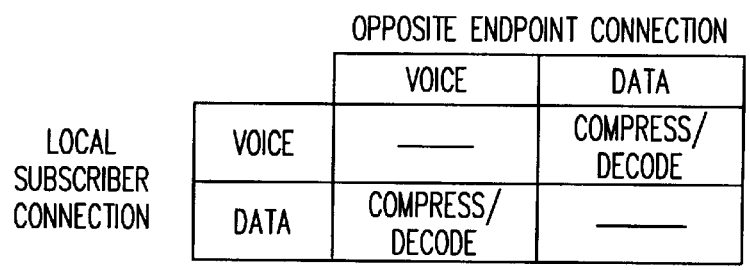

ACCESS PLATFORM FOR INTERNET-BASED TELEPHONY

CROSS-REFERENCE TO RELATED APPLICATIONS

Related subject matter is disclosed in the co-pending, commonly assigned, U.S. Patent application of T. W. Goeddel et al., entitled "Signal Processing Resource Allocation for Internet-Based Telephony," Ser. No. 08/812,254, filed on Mar. 6, 1997.

BACKGROUND OF THE INVENTION

The present invention relates to communications equipment, and, more particularly, to telephony.

It could be argued that the Internet is the fastest growing network in the United States and around the world. Indeed, in the last couple of years use of the Internet has been extending to multimedia communications.

In this regard, current "Internet technology" supports real-time audio communications from one person to another person over the Internet. Typically, this requires at least one of these people to have a personal computer with special hardware and software. For example, International Discount Telephone (IDT), a New Jersey based company, provides a service that enables a personal computer user in one country to call a person with an ordinary telephone in another country over the Internet for a small fraction of the cost charged for calls over the traditional public-switched-telephone-network. In this service, the long distance portion of the call uses an Internet connection between the personal computer user and an IDT "access platform," which is associated with a particular Internet Protocol address in the area of the called telephone number. This access platform is typically a high-performance computer (also known in the art as a "server"). The IDT access platform completes the telephone call to the called party via a plain-old-telephone-service call. Once established, real-time audio communications across the Internet typically uses compressed audio packets since the Internet is a packet-switched communications network. In the IDT approach only the calling party is required to have a personal computer with associated hardware and software that supports multimedia communications over the Internet.

The significant cost reduction with the use of the Internet for long distance telephone communications comes at the expense of lowered quality and reliability. However, this trade-off is acceptable to many users, particularly for overseas callers, who pay very high per minute charges (compared to domestic charges). As the technology advances and the Internet bandwidth capacity increases, it is expected that the quality and reliability of such a Internet-based telephone call should improve.

SUMMARY OF THE INVENTION

Notwithstanding that the quality and reliability of an Internet-based telephone call through a dedicated Internet access platform may, eventually, improve, we have realized that it is advantageous to develop an access platform that provides different grades-of-service using either Internet-type connections or traditional long distance carrier connections in establishing long distance communications for a user.

In an embodiment of the invention, an access platform is coupled to the Internet, a local-exchange-carrier (LEC), and other communications facilities such as, but not limited to, a plurality of long-distance facilities provided by any one of a number of long distance carriers, e.g., AT&T. This access platform is referred to herein as the "alternate access platform" and provides a user with alternative ways of routing a call such as a long distance telephone call. Access to the alternate access platform occurs in any one of a number of ways. For example, a user, or calling party, establishes an Internet-type connection to the alternate access platform, or dials into the alternate access platform via a local plain-old-telephone-service call. Independent of the access method, the alternate access platform selects a communications facility for routing the call as a function of a "call profile" associated with the calling party. This "call profile" uses any one of a number of parameters to determine routing such as called party, cost, quality, reliability, time-of-day, etc. For example, using the "call profile," the alternate access platform establishes telephone calls to a predefined business location over a long distance facility to assure quality, while all other telephone calls are first attempted via the Internet, which albeit of perhaps lower quality are typically cheaper. This "call profile" is either determined by the user on a call-by-call basis, or is separately administered by the user.

BRIEF DESCRIPTION OF THE DRAWING

FIG. 4 is an illustrative flow diagram of a method embodying the principles of the invention for use in alternate access platform 100 of FIG. 2;

FIG. 5 is an illustrative called party table for use in the alternate access platform of FIG. 2;

FIG. 6 is an illustrative routing table for use in the alternate access platform of FIG. 2; and FIG. 7 is an illustrative table showing compression/decompression options as a function of different connections.

DETAILED DESCRIPTION

Figure 1:
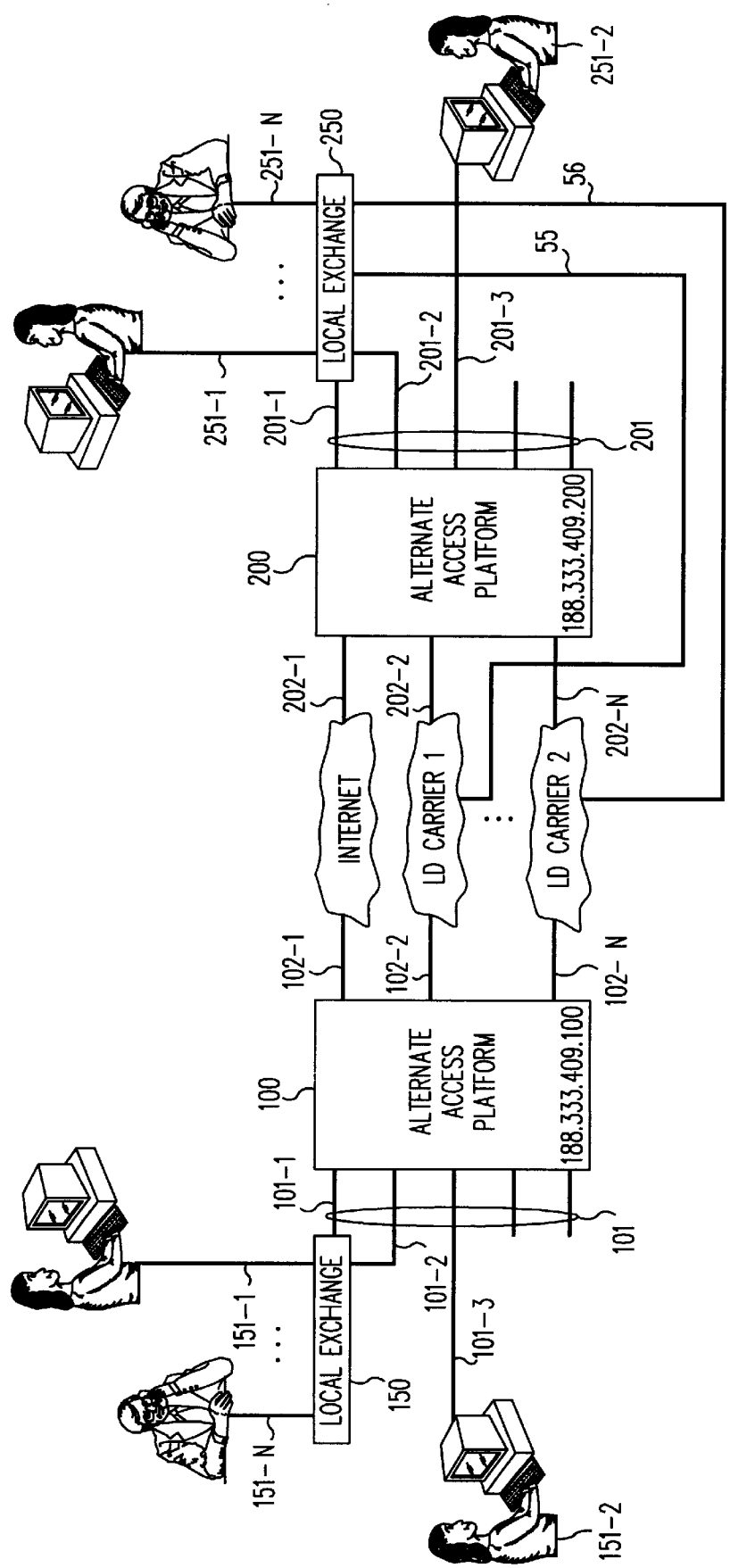
FIG. 1 is an illustrative block diagram of a communications system embodying the principles of the invention.

An illustrative high-level block diagram of a communications system embodying the principles of the invention is shown in FIG. 1. Other than the inventive concept, the elements of FIG. 1 are well-known and will not be described in detail. For example, the technology represented by alternate access platform 100 is that of a "server" as known in the art, e.g., a Pentium™-based work station.

It is assumed that alternate access platforms 100 and 200 both embody the principles of the invention. As such, the inventive concept will primarily be described in the context of a call setup originating with alternate access platform 100. Communications in the opposite direction is similar and will not be described.

As shown in FIG. 1, alternate access platform 100 is illustratively coupled to a number of different types of communications channels, facilities, or lines. For simplicity, only a small number of facilities are shown to simplify description of the inventive concept. Those skilled in the art will realize that other types and mixes of facilities can be used to practice the invention. In this context, facilities 101-1, 102-2, 102-n, 201-1, 202-2, and 202-n, are illustratively T1 lines; facilities 101-2 and 201-2 are illustratively analog lines; and facilities 101-3, 102-1, 201-1, and 202-3, are illustratively Internet lines. Since these various facility types are known in the art, they (and any concomitant interfaces) will not be described in detail. In addition, it is assumed that facilities 55 and 56 are T1 lines for conveying communications between each long distance (LD) carrier and local exchange 250.

Analog line 101-2 and T1 line 101-1 couple alternate access platform 100 to a portion of the public-switched-telephone-network (PSTN) as represented by local exchange 150. The latter represents a central office that provides telephone service to a number of subscribers, or users, as represented by terminal equipment 151-1 to 151-n. Each of these users can have different types of terminal equipment. For example, terminal equipment 151-1 is a personal computer (PC) that is equipped to provide both voice and data, or multimedia, communications via an analog modem (i.e., includes suitable hardware and software to provide packet audio as known in the art) while terminal equipment 151-n has a plain-old-telephone-service (POTS) telephone. As used herein, a term of the form "user 151-1" refers to the user associated with that particular terminal equipment. A similar description is applicable to local exchange 250.

For illustration purposes, alternate access platform 100 is coupled to each LD carrier via a T1 line such as T1 line 102-2 to LD Carrier 1. However, it should be realized that the actual connection to each LD Carrier can be done in a number of different ways. For example, T1 lines 102-2 to 102-n of alternate access platform 100 could have alternatively been shown as coupled to a local exchange, which provides access to each of the different LD Carriers via a selection code (like 1-800-call-ATT). In this context, T1 lines 102-2 to 102-n are not dedicated to a particular long distance carrier and can be used to access any LD carrier.

For the purposes of this description, the following additional terminology is defined. As noted above, there are various communications facilities coupled to alternate access platform 100, e.g., T1 lines, analog lines, and Internet lines. While some of these communications facilities could be characterized as circuit-switched or packet-switched, a distinction is made herein as to the "type of connection" established between two endpoints using these facilities. In particular, the "type of connection" refers to either a "voice connection" or a "data connection." In the former, a circuit-switched voice connection is established between two endpoints as known in the art. In the latter, an Internet Protocol (IP) connection is established as known in the art using a transmission control protocol (TCP) or a user datagram protocol (UDP). (It should be noted that an IP connection can be routed over circuit-switched facilities.)

Figures 2, 3:
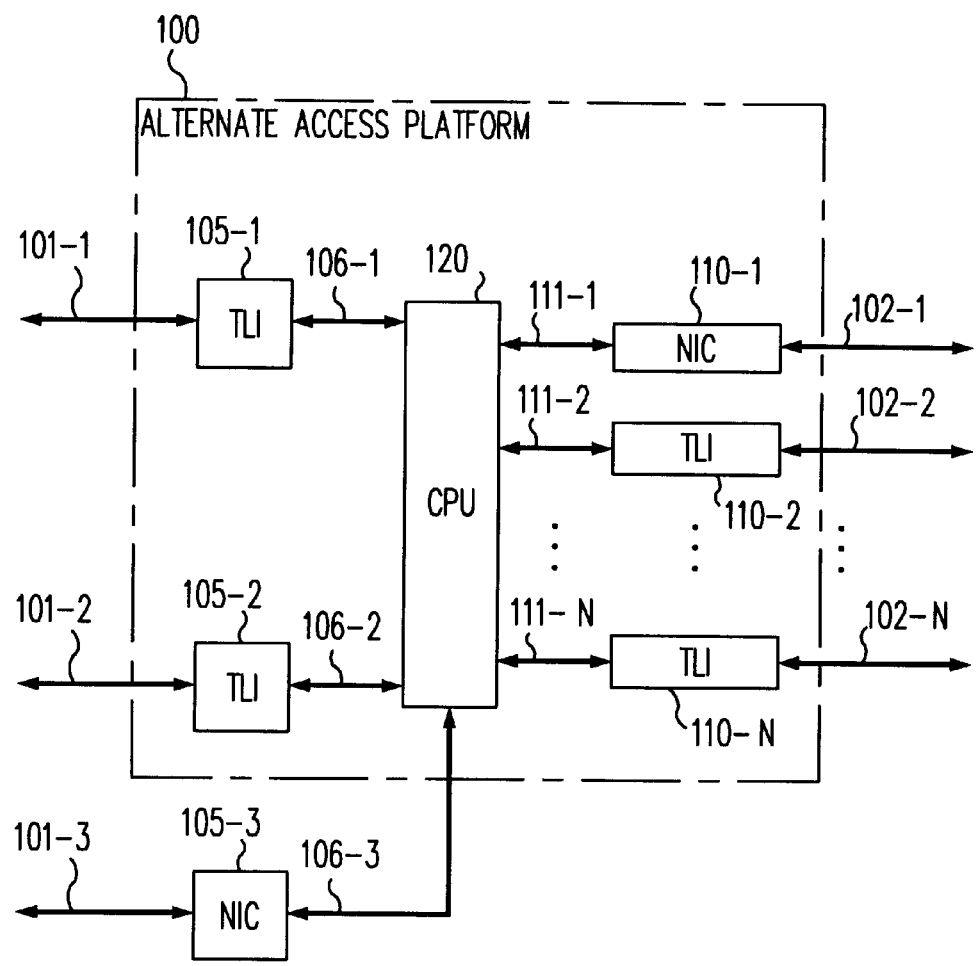
FIG. 2 is an illustrative block diagram of an alternate access platform in accordance with the principles of the invention.
FIG. 3 is an illustrative facilities table for use in the alternate access platform of FIG. 2.

An illustrative block diagram of alternate access platform 100 is shown in FIG. 2. As noted earlier, alternate access platform 100 is a server, which, in accordance with the inventive concept, is configured to provide alternate forms of access to different types of services. Alternate access platform 100 includes corresponding interface hardware and software (herein referred to as a controller) for coupling to the various above-mentioned facilities. In this example, controllers 105-1, 105-2, and 110-2 to 110-n are "Trunk/Line Interface" (TLI) controllers for supporting T1 and analog lines, and controllers 105-3 and 110-1 are "network Interface" (NI) controllers for supporting Internet lines. Illustrative representations of these interfaces exist today and are available on circuit boards or cards. For example, TLI controllers are available from Natural Micro System, and NI controllers are available from 3Com.

For simplicity, each controller is shown as being directly coupled to processing circuitry, e.g., central processing unit (CPU) 120, via a particular "bus," such as bus 106-1 for TLI controller 105-1. However, it should be realized that in actual practice some controllers may be coupled to CPU 120 via the same bus. For example, server 100 may include both ISA and PCI buses as known in the art. As such, some of the controllers may transfer information via the ISA bus while other controllers plug into both the ISA and the PCI bus. In addition, the controllers may also vary in their ability to adhere to other PC-type transfer mechanisms such as SCSA (Signal Computing System Architecture), MVIP (Multivendor Integration Protocol), etc. CPU 120 represents the remainder of server 100 and includes a processor (such as a Pentium™), volatile and non-volatile memory that includes both read-only memory (ROM), random-access memory (RAM) and storage devices such as a hard disk, keyboard and display.

In accordance with the inventive concept, alternate access platform 100 is configured to provide subscribers alternate forms of access to different types of services via a "call profile" and also provides a set of "enhanced services" (described below). As such, alternate access platform 100 stores a data base of information, which is illustratively shown as a facilities table in FIG. 3. This table provides a cross-index for quality and cost for each communications facility associated with a particular provider. This table is stored on the above-mentioned hard disk (not shown) of alternate access platform 100.

As shown in FIG. 3, the entries for cost are simplified for illustration purposes to X, Y, and Z, dollars, where it is assumed that X<Y<Z. It should also be noted that any cost figures can be further indexed to account for the day of the week, time of the day, etc. (For example, LD carrier 1 may be cheaper during the week compared to prices offered by LD carrier 2, but on the weekends the reverse may be true.)

As used herein, the term "quality" refers to the general quality of transmission. For example, for voice transmission, the quality of the Internet may be characterized as "low" because of the risk of delay, lost packets, and, generally speaking, low audio quality. In contrast, the quality provided by LD carrier 1, and LD carrier 2, is expected to be higher than the Internet. For purposes of this example, it is assumed that these latter communication networks provide the same quality, e.g., "high" as shown in FIG. 3.

At this point, in order to facilitate understanding the inventive concept, reference should be made to FIG. 4, which represents an illustrative method for use within alternate access platform 100 to process a call between, e.g., user 151-n and user 251-n. In this first example, the call is a POTS voice call, and it is assumed that user 151-n is the calling party and user 251-n is the called party. In this instance, user 151-n goes "off-hook" and dials a predefined telephone number associated with alternate access platform 100. It is assumed that this telephone number is associated with analog line 101-2. In step 400, alternate access platform 100 establishes a connection to user 251-n as known in the art, e.g., by answering the incoming call. At this point, it should be noted that the type of connection (voice or data) between user 251-n and alternate access platform 100 is determined by the very process of establishing the connection. For example, if user 151-1 has established a connection via terminal equipment 151-1, the modem handshaking process, etc., results in the establishment of a TCP/IP connection, which is referred to herein as a data connection.

In step 405, alternate access platform 100 recovers user identification. If the connection is a voice connection—as in this example—alternate access platform 100 recovers the well-known Automatic Number Identification (ANI) information from the incoming telephone call, via TLI controller 105-2. Conversely, when a data connection is established, the IP address of user 151-n is recovered from the negotiated IP connection.

In step 410, called party information is received. For a voice connection, CPU 120 of alternate access platform 100 provides a signal, e.g., a tone, (via TLI controller 105-2) to user 151-n to indicate that alternate access platform 100 has answered the call. (Alternatively, a more sophisticated interactive-voice-response (IVR) system as known in the art can be used. This would also allow additional feedback to be provided to a user such as "please wait while your call is processed.") User 151-n enters the called party telephone number via, e.g., the touch-tone keypad of terminal equipment 151-n, which is received by alternated access platform 100, via TLI controller 105-2. Similarly, when a data connection is established, an "html-compatible" form (not shown) is displayed by alternate access platform 100 with a corresponding entry field highlighted for the called party telephone number.

In step 415, alternate access platform 100 retrieves a "call profile" associated with the identified user, here user 151-n. A "call profile" offers a hierarchy of access for different call types for each user. A user's "call profile" is stored as a data base and indexed as a function of either the user's telephone number or IP address. An illustrative call profile 500 for user 151-n comprises two tables, which are illustrated by FIGS. 5 and 6, respectively.

An illustration of the first table, the called party table, is shown in FIG. 5 for user 151-n. Settings in this table allow user 151-n to individually determine route selection as a function of the called party. The called party table comprises a number of fields: the called party telephone number, the quality field, and the routing field. The called party telephone number field is self-explanatory. The quality field in this example is the quality desired for a call to that called party. Illustratively, it is assumed that the quality field consists of: "high," "low," and "NIA" (not applicable). Finally, the routing field determines the routing method. In this example, it is assumed that alternative routing methods are: "least cost," "first available," and "facility provider." The "least cost" entry instructs alternate access platform 100 to select, for a given quality, that long distance facility that is the cheapest when making the call (as determined from the facilities table of FIG. 3). The "first available" entry instructs alternate access platform 100 to select, for a given quality, the first available long distance facility, which, e.g., could be selected on a round-robin basis. Finally, a "facility provider," as represented by the entry "LD Carrier 1," is used by alternate access platform 100 to use the identified facility provider. It should be noted that for a quality entry of "N/A," the quality field is ignored in selection of the communications facility. For example, for an entry of "N/A," alternate access platform 100 selects the communications facility as a function of the entry in the routing field.

However, if the called party's telephone number is not entered into the called party table, then alternate access platform 100 routes the call in accordance with a routing table that identifies general routing preferences for each user, or subscriber. An illustrative routing table entry for user 151-n is shown in FIG. 6. The routing table entry for user 151-n comprises a number of fields: the quality field, and the routing field. The quality field and the routing fields, in this example, are similar to the respective fields in the above-described called party table. Alternate access platform 100 routes the call in accordance with these entries. For example, a "least cost" entry in the routing field instructs alternate access platform 100 to select, within a given quality, that facility that is the cheapest when making the call.

Returning to FIG. 4, alternate access platform 100 routes the call in step 420 by selecting the appropriate communications facility in accordance with either the called party table or the routing table as appropriate. In step 425, alternate access platform 100 establishes a connection to an opposite endpoint. This connection is a function of the type of communications facility selected. If alternate access platform 100 selects an LD carrier for routing the call, alternate access platform 100 establishes a voice connection with the called party and simply dials the called party telephone number. The LD carrier completes the telephone call through the PSTN as represented by facilities 55 and 56, of FIG. 1. In contrast, if alternate access platform 100 selects an Internet line for routing the call, then alternate access platform 100 establishes a data connection with another alternate access platform, herein represented by alternate access platform 200. In order to establish this data connection, alternate access platform 100 "maps" the called party telephone number into an IP address. As such, alternate access platform 100 additionally stores a "mapping table" (not shown) that associates the area code portion of a called party telephone number with a respective IP address of another alternate access platform. In this example, the area code of the called party is used by alternate access platform 100 to index into this "mapping table" to retrieve an associated IP address that corresponds to alternate access platform 200, i.e., IP address 188.333.409.200.

Subsequent to establishing a data connection to alternate access platform 200, additional steps such as "call signaling," and, perhaps, "compression/decompression" of respective audio signals are also performed by alternate access platform 200.

With regards to "call signaling," a packet signaling format is used to communicate call signaling information for "call setup," "call tear-down," etc., between alternate access platforms. In particular, the well-known H.323 protocol is used to support the exchange of signaling information between alternate access platform 100 and alternate access platform 200. For example, using the H.323 protocol, signaling messages are illustratively transmitted in the command fields by using predefined formats. In its basic form a signaling message comprises a message-type sub-field, and a data sub-field. In this context, a call setup message comprises a predefined number in the message type sub-field indicating that this is a call setup signaling message. As such, the data sub-field carries the called party telephone number. Continuing with the example, upon receiving a call setup message, over Internet line 201-1, alternate access platform 200 places a telephone call to the indicated called party using the received called party telephone number.

As known in the art, compression of audio information is typically used in a data connection. (If should be noted that in some instances, e.g., system configurations, available bandwidth, etc., it may not be necessary to compress the audio. However, for the purposes of this example, it is assumed that audio is compressed on any data connection. Should such compression be optional, then the alternate access platform is suitably modified.) As such, alternate access platform 100 performs compression/decompression of audio as shown in FIG. 7 as a function of the types of connections between each pair of endpoints. For example, if a voice connection exists to the local subscriber, e.g., user 151-n, and a voice connection exists to the opposite endpoint, which is associated with user 251-n, as described above, then no compression/decompression is required. However, in this instance, if a data connection is, instead, established to alternate access platform 200, then compression/decompression is enabled as between alternate access platform 100 and alternate access platform 200. (The use of compression/decompression is governed in a similar manner in the so-called receiving alternate access platform 200.) From FIG. 7, it can be observed that if a data connection exists on both pairs of connections, then alternate access platform 100 simply passes through the compressed audio. For example, if user 151-3 establishes a data connection to alternate access platform 100, and the latter establishes a data connection to alternate access platform 200, no compression/decompression is performed in alternate access platform 100.

In the earlier example, user 151-n established a voice connection to alternate access platform 100, which then routed the call as a function of the call profile associated with user 251-n. In a similar fashion, as noted above, calls are completed between users 151-1 and 151-2 and users 251-1, 251-2, or 251-n. It should be noted that in the case of the called party being user 251-1 and 251-2, a data connection is established between alternate access platform 200 and either user 251-1 or 251-2. If the call is a PC to PC call, the IP address of the called party is identified by their IP address via the above-mentioned "html form" (not shown). However, if the call is a POTS to PC call, the calling party provides the IP address via touch-tones. For example, if the called party's IP address is 108.456.332.324, the calling party enters equivalent touch-tones corresponding to 108#456#332#324, where the "#" symbol is used to represent the "." of the IP address format. From the point of view of the access platform, discrimination between whether a PSTN-style telephone number is being entered or an IP address is being entered can be indicated by use of a predefined touch-tone, e.g., "*" in front of an IP address.

It should be noted that other more complex routing schemes can be implemented such as further indexing the calling party profile based upon the time of day, day of the week. For example, a called party number entry in the called party table may only be active during business hours, while calls at other times of the day are routed according to the routing table.

The above-mentioned calling party profile can be established in any one of a number of ways. For example, upon opening an account with the alternate access provider, a user can simply provide such information on paper to a system administrator, who enters the information into the above-mentioned tables. Conversely, a voice-response system could be implemented on alternate access platform 100. This voice-response system, as known in the art, allows a calling party to enter and retrieve information. In fact, in place of, or in addition to, the above-mentioned calling party profile, a voice-response system could be used on each call to solicit the routing information from the calling party.

Other variations are also possible, e.g., instead of the above-described "two-stage" dialing procedure (i.e., first the calling party dials the alternate access provider, then the calling party dials the called party), a simple speed dialing feature could be implemented in alternate access platform 100. For example, after dialing the telephone number associated with alternate access platform 100, a user could then enter a code, e.g., a two digit number such as "#2" which is indexed into a speed dialing table associated with the particular calling party. From this speed dialing table, the called party telephone number can be retrieved.

Also, although the above-described method of FIG. 4 illustrated the use of ANI, other forms of calling party identification can be used. For example, the calling party could enter an identification number (ID) and password. The identification number could be used to index into the calling party profile independent of the calling party number, while the password is used for security purposes. Combinations are also possible. For example, the ANI could be used for identification, but the calling party could still be prompted for a password for security purposes.

As a result of the above, alternate access platform 100 provides different grades-of-service using either Internet-type connections or traditional long distance carrier connections. Also, as noted earlier, alternate access platform can also provide many additional enhanced services such as:

1) Messaging services:
   Mail boxes that provide voice, e-mail, and fax storage for users, or for groups of users;
   conversion of e-mail messages to voice and vice versa;
   timed delivery of messages;
2) Integration of a pager;
3) Call forwarding (e.g., the receiving alternate access platform could redirect incoming long distance telephone calls to another location); and/or
4) Allowing users with only voice terminal equipment to access Internet web pages (e.g., providing suitable text to speech conversion);

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was described in the context of local telephone access, via local facilities 101-1 and 101-2, other methods of local access are possible, such as, but not limited to, the use of cable facilities for coupling to cable networks, local area network (LAN) facilities for coupling to LANs, Wide Area Network (WAN) facilities for coupling to WANS, direct coupling to a private branch exchange (PBX) and, simply, an Internet connection. In each of these cases, suitable controllers would be included within the alternate access platform. Similarly, other types of communications networks can be used to transport information from one alternate access platform to another. For example, a satellite communications system could be used as yet another alternative to either use of the Internet, LD carrier 1, or LD carrier 2. Or, a private-data-network can be used as an alternative. A private-data-network should provide a cost alternative that is somewhere between the Internet and an LD carrier. It should be noted that other types of long distance communications networks may require additional mapping entries (similar to the Internet mapping mentioned above) to correctly route the telephone call. Similarly, additional types of local access facilities may require modification to items such as the calling party profile, which as described above was indexed to the calling party telephone number. For example, if local access is also possible from a LAN, a source address could be translated to an equivalent calling party telephone number, or separate calling party profiles could be used for calls coming in from the Internet versus the PSTN, etc., Also, although the characterization of various attributes has been illustrated by, e.g., the use of such terms as "low" and "high" in describing the grade-of-service, it should be realized that other representations, or variations, are possible.

What is claimed:

1. A communications apparatus comprising:

a computer programmed to provide different grades-of-service using either an Internet-type connection or a long distance carrier connection in establishing long distance communications for a user wherein the computer selects which connection to use as a function of a calling party profile stored within the computer and associated with the user and wherein the calling party profile includes a called party table that associates quality of transmission with called party numbers for use by the computer in selecting the connection; and wherein the computer comprises a data base for mapping a telephone number of the called party to an Internet address when the computer selects the Internet-type connection.

2. Apparatus for providing communications, the apparatus comprising:

a plurality of local facility interface circuits for coupling to a corresponding plurality of local facilities, where the plurality of local facilities includes at least one circuit-switched facility;

a plurality of long distance facility interface circuits for coupling to a corresponding plurality of long distance facilities, where the plurality of long distance facilities includes at least one circuit-switched facility and at least one packet-switched facility; and processing circuitry for storing calling party information and for establishing a call between a calling party associated with one of the local facilities and a called party by selecting one of the long distance facilities as a function of the stored calling party information;

wherein the stored calling party information includes a called party table that associates information representative of a quality preference of the calling party with respect to called party numbers and wherein the processing circuitry selects the long distance facility as a function of at least this quality preference; and wherein the processing circuitry further stores a data base for mapping a telephone number of the called party to an Internet address when the processing circuitry selects the at least one packet-switched facility.

3. Communications apparatus comprising:

an interface circuit for coupling to a public-switched-telephone network for receiving an incoming telephone call from a calling party;

a number of interface circuits for coupling to a plurality of long-distance facilities that include at least one circuit-switched facility and at least one packet-switched facility; and processing circuitry responsive to the incoming telephone call for selecting one of the plurality of long distance facilities for use in establishing a telephone call to a called party;

wherein the processing circuitry selects the one of the plurality of long distance facilities as a function of a calling party profile associated with the calling party and retrieved by the processing circuitry and wherein the calling party profile includes a called party table that associates information representative of a quality preference of the calling party with respect to called party numbers and wherein the processing circuitry uses this quality preference in selecting the one of the plurality of long distance facilities; and wherein the processing circuitry further stores a data base for mapping a telephone number of the called party to an Internet address when the processing circuitry selects the at least one packet-switched facility.

4. A method for use communications equipment for providing communications between a calling party and a called party, where the communications equipment is coupled to a plurality of local access facilities and a plurality of long distance facilities that include at least one circuit-switched facility and at least one packet-switched facility, the method comprising the steps of:

answering an incoming call from the calling party over one of the local access facilities;

identifying the calling party;

retrieving a calling party profile associated with the identified calling party; and selecting one of the long distance facilities as a function of the retrieved calling party profile for use in providing communications between the calling party and the called party; and wherein the retrieved calling party profile includes a called party table that associates a quality preference for the identified calling party with respect to called party numbers and the selecting step includes the step of comparing at least this quality preference to quality information associated with each one of the long distance facilities to select the long distance facility in accordance with the quality preference; and wherein the incoming call is a telephone call and further including the step of mapping a telephone number of the called party to an Internet address when the selected one of the long distance facilities is the packet-switched facility.

5. A method for use communications equipment for providing communications between a calling party and a called party, where the communications equipment is coupled to a plurality of local access facilities and a plurality of long distance facilities that include at least one circuit-switched facility and at least one packet-switched facility, the method comprising the steps of:

receiving an incoming call from the calling party over one of the local access facilities; and selecting one of the long distance facilities as a function of a calling party profile for use in providing communications between the calling party and the called party; and mapping a telephone number of the called party to an Internet address when the selected one of the long distance facilities is the packet-switched facility;

wherein the calling party profile includes a called party table that associates a quality preference for the calling party with respect to called party numbers and the selecting step includes the step of comparing at least this quality preference to quality information associated with each one of the long distance facilities to select the long distance facility in accordance with the quality preference.

* * * * *